B. O. FANSLOW.
CHECK WRITING MACHINE.
APPLICATION FILED JAN. 29, 1915.

1,337,006.

Patented Apr. 13, 1920.
9 SHEETS—SHEET 1.

WITNESSES
Geo. A. Serio
Marie R. Leahy

INVENTOR:
Benjamin O. Fanslow.
BY Chas. H. Chapman
ATTORNEY.

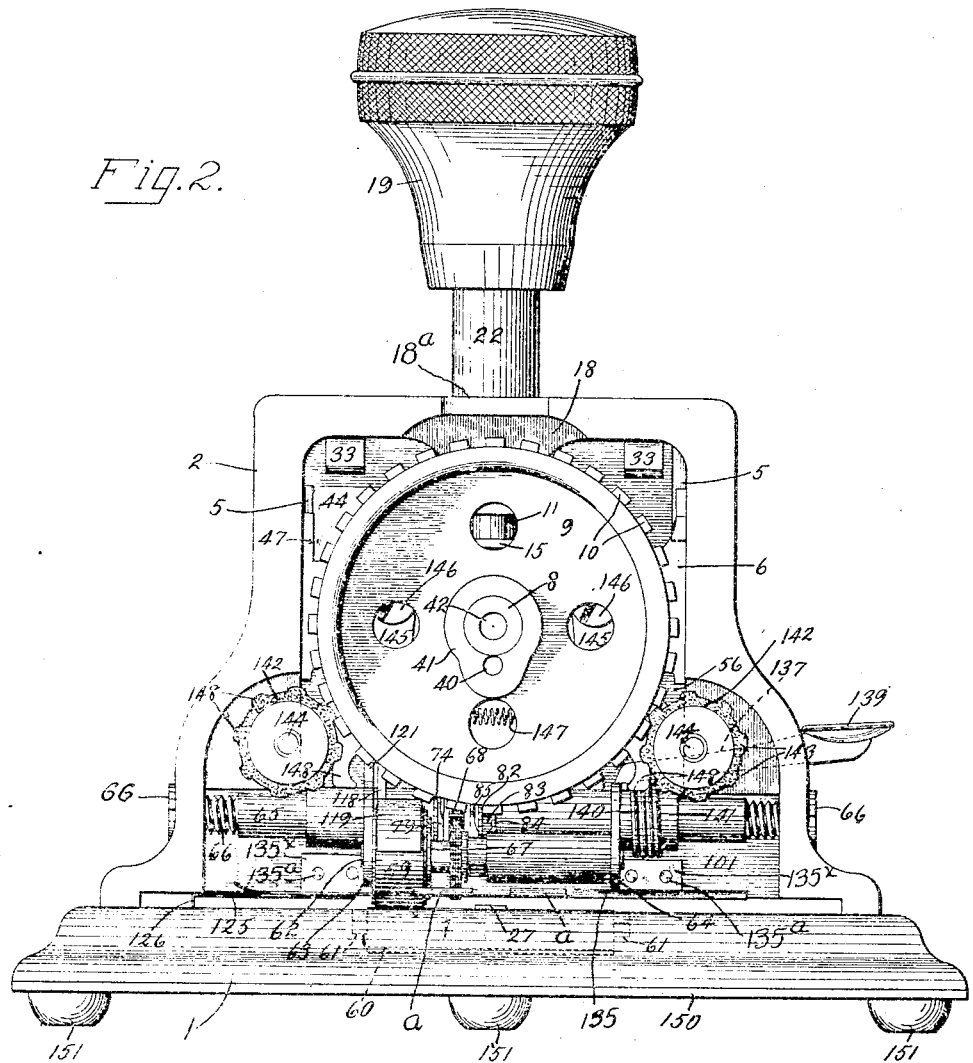

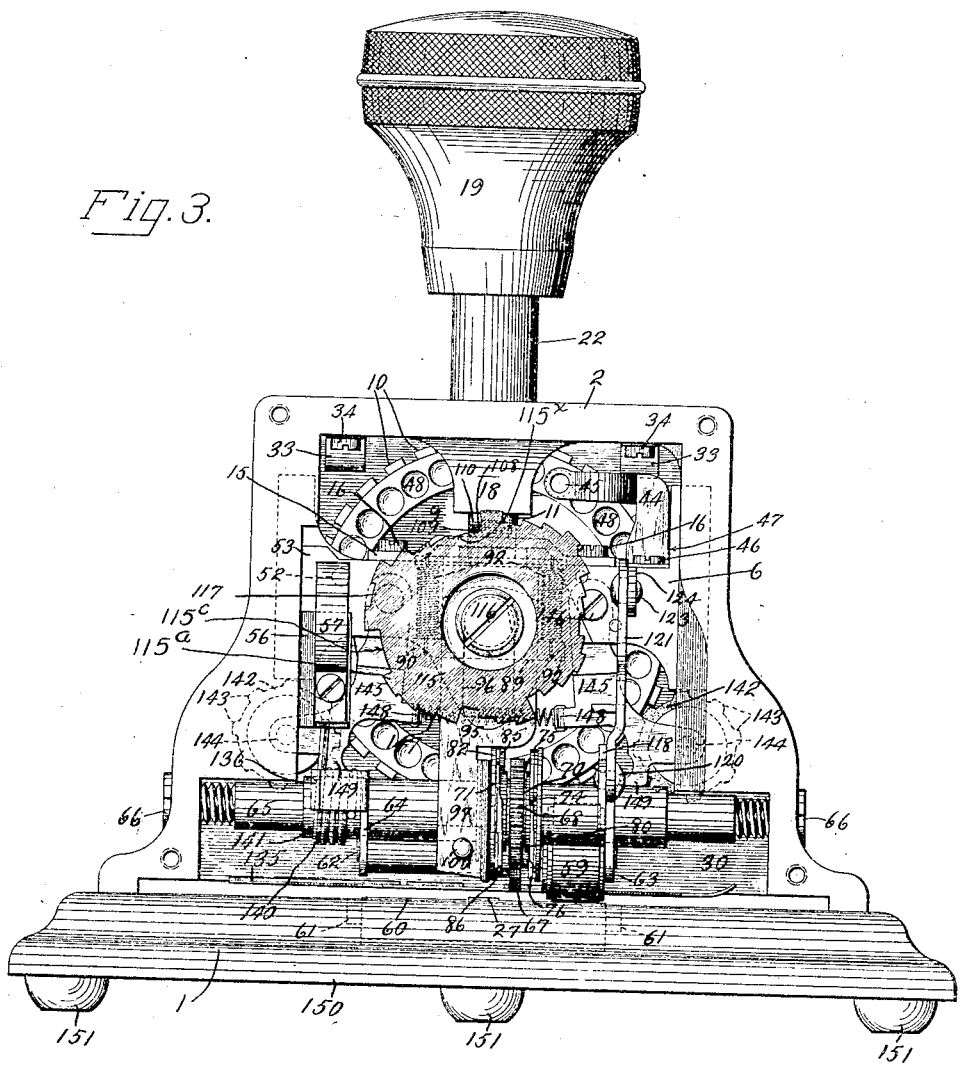

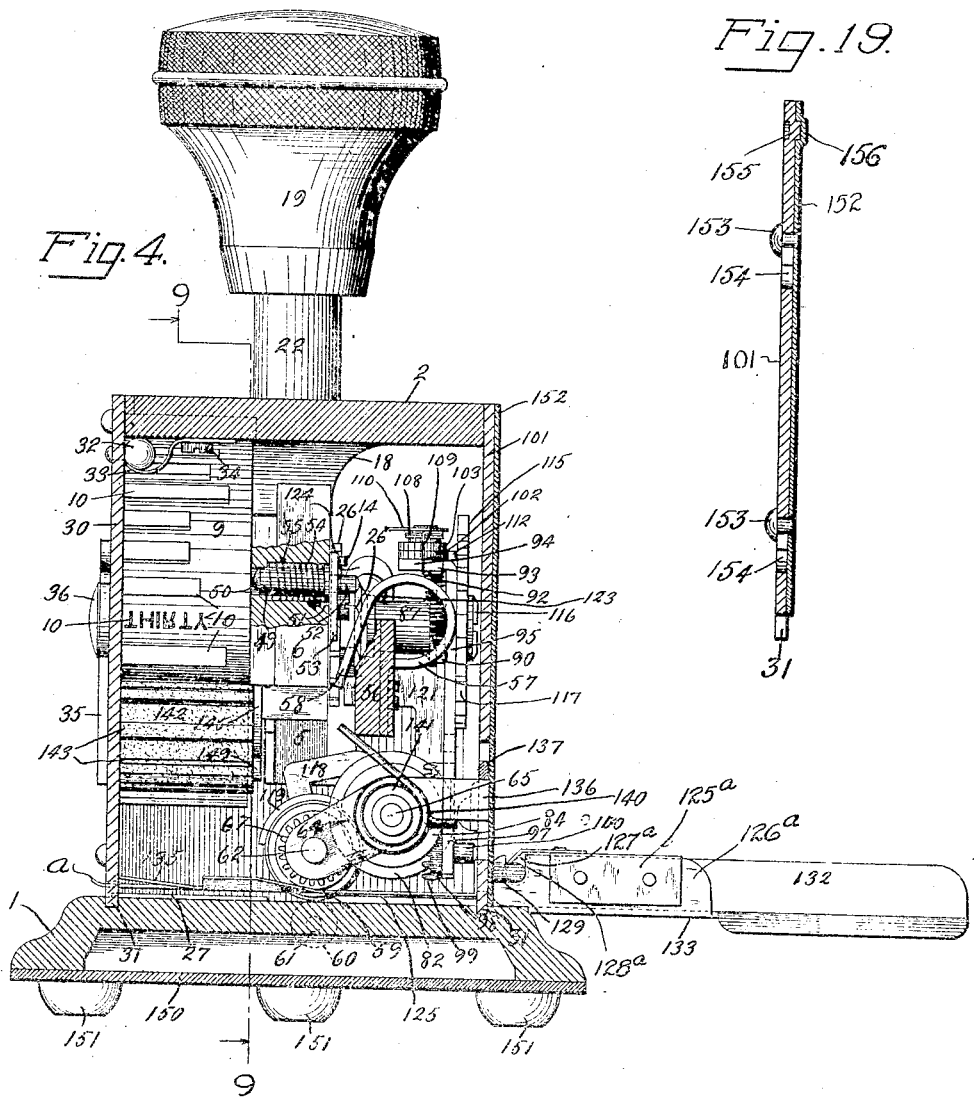

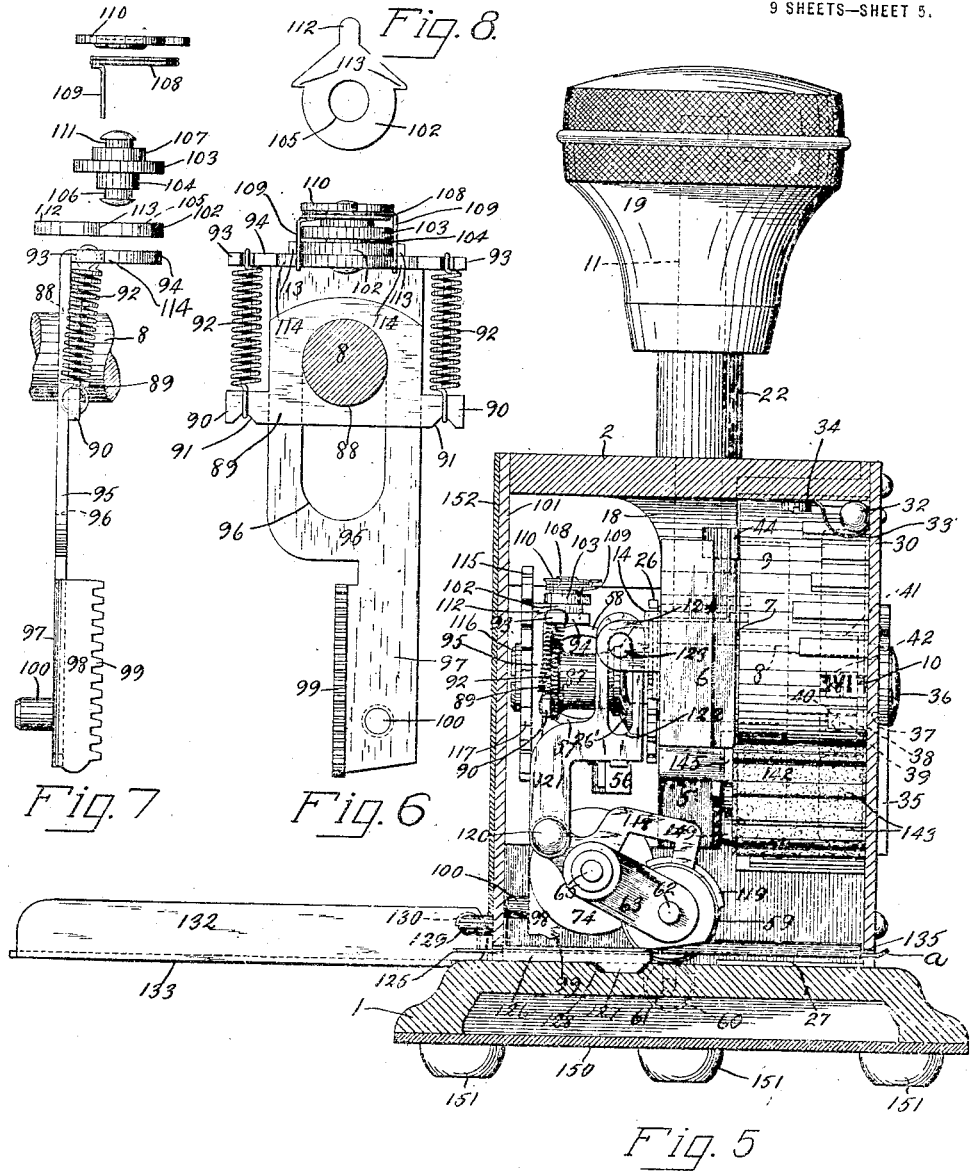

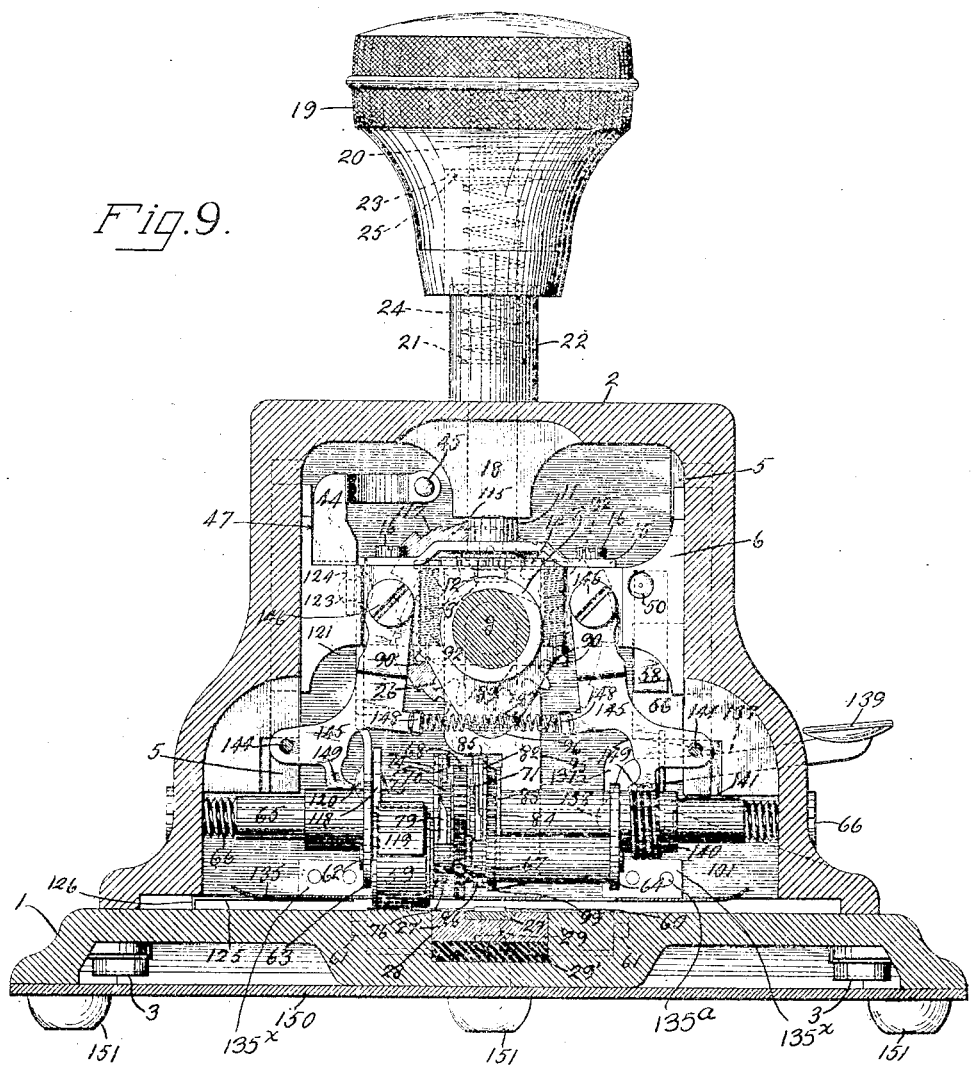
Fig. 9.
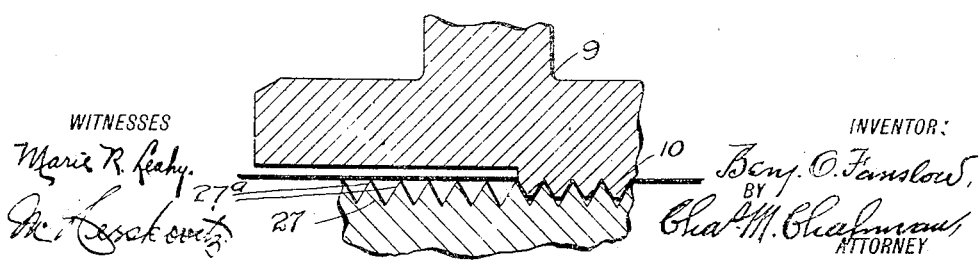
Fig. 9ª

B. O. FANSLOW.
CHECK WRITING MACHINE.
APPLICATION FILED JAN. 29, 1915.

1,337,006.

Patented Apr. 13, 1920.
9 SHEETS—SHEET 7.

WITNESSES

INVENTOR:
Benj. O. Fanslow,
BY
Chas. M. Chapman,
ATTORNEY

B. O. FANSLOW.
CHECK WRITING MACHINE.
APPLICATION FILED JAN. 29, 1915.
1,337,006.
Patented Apr. 13, 1920.
9 SHEETS—SHEET 8.
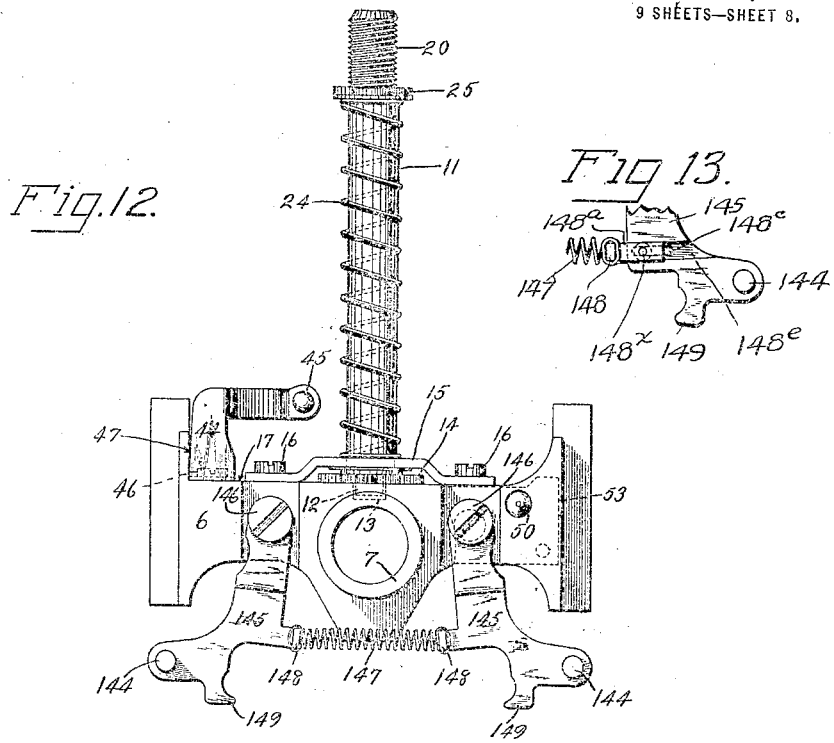
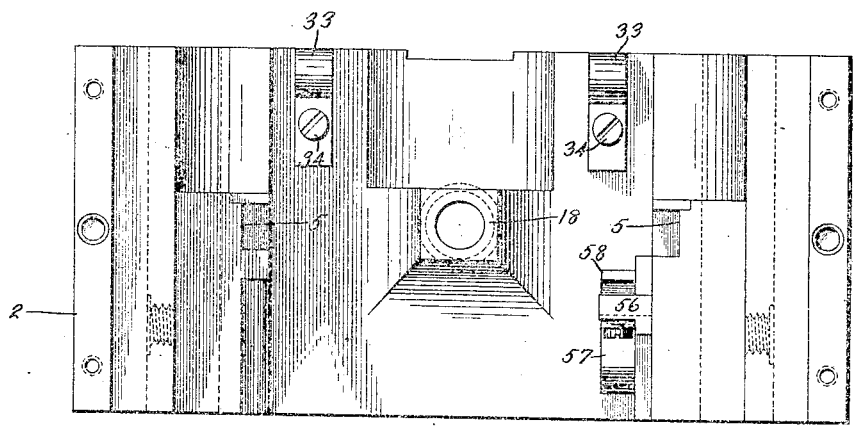
WITNESSES
INVENTOR
Benj. O. Fanslow
BY
Chas. M. Chapman,
ATTORNEY

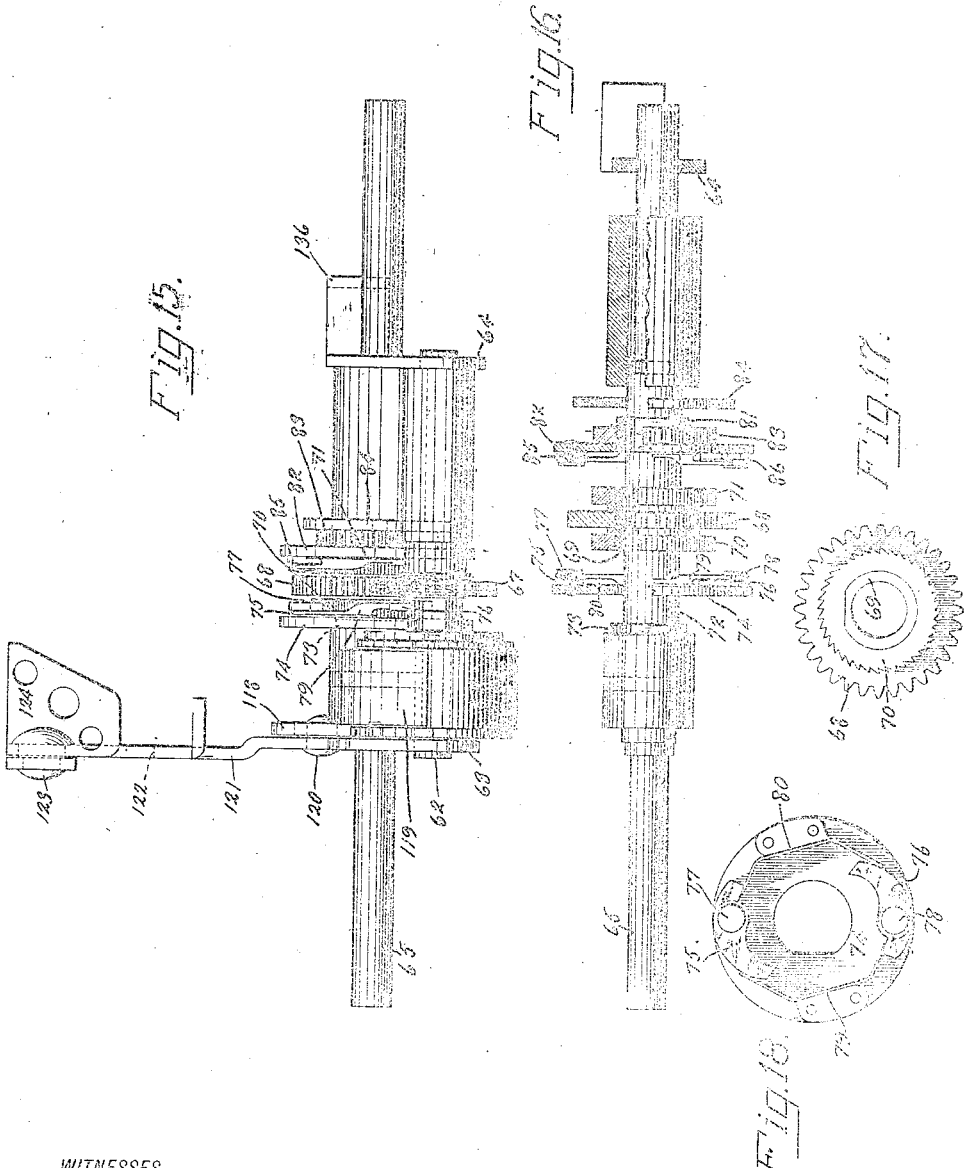

UNITED STATES PATENT OFFICE.

BENJAMIN O. FANSLOW, OF QUEENS COUNTY, NEW YORK, ASSIGNOR TO NEW ERA MFG. COMPANY, OF NEW YORK, N. Y., A CORPORATION OF NEW YORK.

CHECK-WRITING MACHINE.

1,337,006.   Specification of Letters Patent.   Patented Apr. 13, 1920.

Application filed January 29, 1915. Serial No. 5,008.

*To all whom it may concern:*

Be it known that I, BENJAMIN O. FANSLOW, a citizen of the United States, residing in Hollis Court Boulevard, county of Queens, Long Island, and State of New York, have invented a new and useful Improvement in Check-Writing Machines, of which the following is a description.

The invention relates to new and useful improvements in check writing machines, and more particularly to a check writing machine wherein the value of the check is printed thereon in words which may be of varying length.

An object of the invention is to provide a check writer of the above type which is strong, durable and compact, and wherein the various parts are so controlled and operated as to insure a proper feed length of the check corresponding to the word being printed, with the proper space between the words and proper alinement of the words on the check.

A further object of the invention is to provide a machine of the above type having a feeding device for feeding the check, wherein the actuating member for the feeding device is moved rearwardly to a fixed predetermined point at each printing operation, and is moved forwardly after the printing operation to a point determined by the length of the word which has been printed.

A further object of the invention is to provide a check writer of the above type wherein the reciprocating member controlling the action of the feeding device is positively moved in both directions by the actuating member therefor.

A still further object of the invention is to provide a check writer of the above type wherein a stripper plate is rigidly mounted at the rear of the machine and extends across the machine to a point in advance of the front wall thereof, said stripper plate being formed with a suitable opening through which the printing wheel engages the check for printing the same.

A still further object of the invention is to provide a check writer of the above type wherein the feeding devices for the check operate not only to feed the check forward but to insure the check following the gage member therefor so as to properly aline the words on the check.

A still further object of the invention is to provide a check writer of the above type wherein the printing wheel, the pointer coöperating with the index plate for indicating the position of the printing wheel, and the gaging member for determining the length of feed stroke of the feeding device, are all positively connected together so as to maintain their relative position to each other as they are shifted from one point to another in the operation of the machine.

A still further object of the invention is to provide a check writer of the above type wherein the index plate at the front of the machine is readily removable and wherein the pointer is detachably connected with the shaft carrying the printing wheel and means is provided for determining the position of the pointer relative to the shaft so that when removed, it may be replaced in the proper predetermined position relative to the printing wheel fixed to the shaft.

A still further object of the invention is to provide a check writer of the above type wherein the pointer when removed from the shaft is held loosely by the index plate.

Another object of the invention is to provide a check writer having ribs formed on the printing wheel characters and also on the die, said ribs being staggered relative to each other, and the ribs on the die being deeper than the ribs on the printing wheel whereby the wear incident to the mutilating of the paper is placed to a large degree on the die.

A still further object of the invention is to provide a check writer having a die plate coöperating with the printing wheel wherein said die plate is mounted on a cushion of yielding material so as to deaden the noise and reduce to a minimum the wear incident to the printing of the check.

These and other objects will in part be obvious and will in part be hereinafter more fully disclosed.

In the drawings which show by way of illustration one embodiment of the invention:—

Fig. 2 is a front elevation of the machine with index or face-plate and pointer removed;

Fig. 3 is a rear elevation of the machine with the back-plates removed;

Fig. 4 is a vertical section substantially on the line 4—4 of Fig. 1, the arrows indicating the direction of view;

Fig. 5 is a vertical section substantially on the line 5—5 of Fig. 1, the arrows indicating the direction of view;

Fig. 6 is a rear elevation of the feed-rack and operating mechanism;

Fig. 7 is a side elevation of said mechanism with certain of the parts separated in order to clearly disclose their structure;

Fig. 8 is a plan view of a detail shown in Figs. 6 and 7;

Fig. 9 is a vertical section on the line 9—9 of Fig. 4, the arrows indicating the direction of view;

Figure 10:
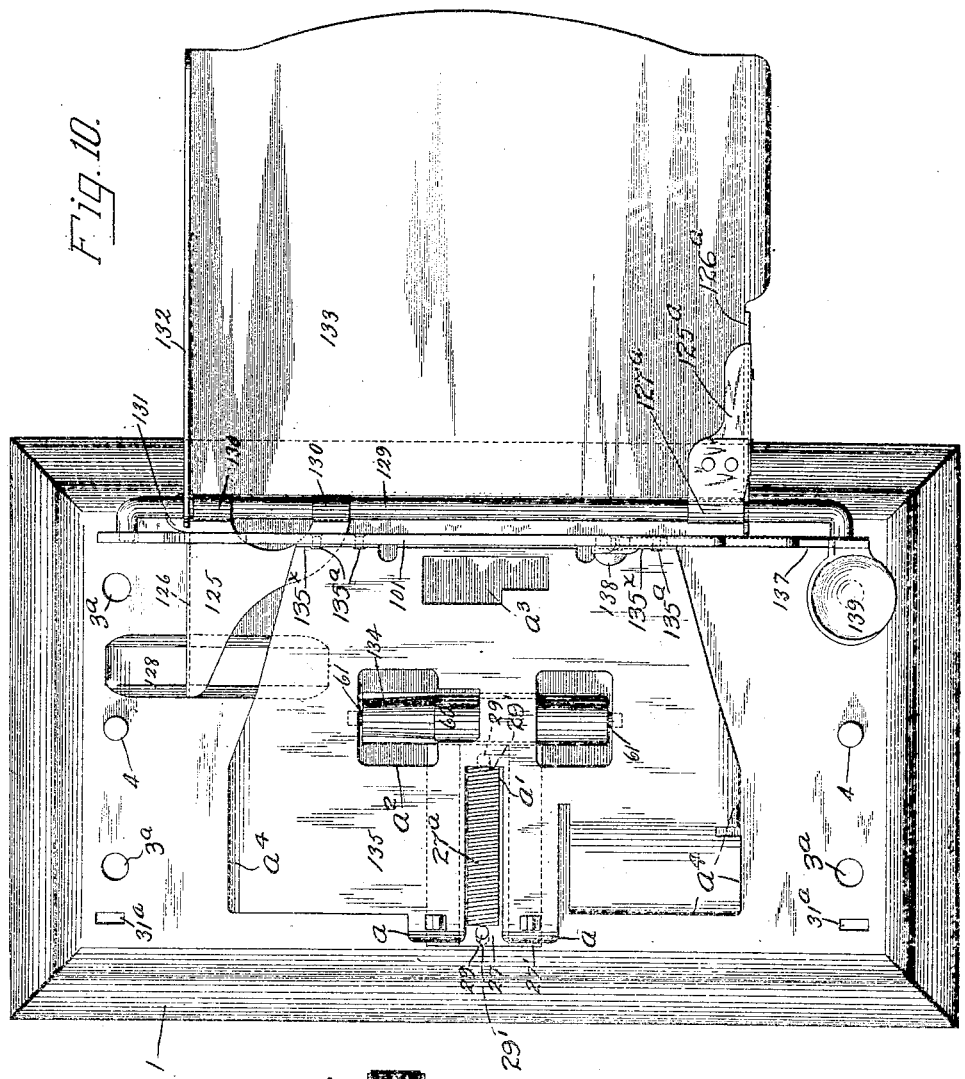
Figure 11:
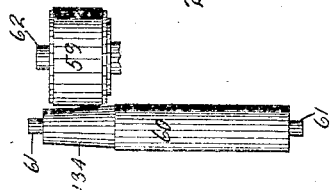

Fig. 9$^a$ is an enlarged sectional detail of the printing-wheel and coöperating die plate;

Fig. 10 is a top plan view of the base of the machine showing the check guiding mechanism and stripper in position;

Fig. 11 is a detail showing the coöperation of the feed rolls;

Fig. 12 is a front elevation of the cross-head plunger and parts carried thereby;

Fig. 13 is a detail showing the means by which the pressure of the inking rolls may be regulated;

Fig. 14 is a bottom plan view of the frame of the machine;

Fig. 15 is an elevation of the feed actuating mechanism;

Fig. 16 is a view of the supporting shaft for the feed actuating mechanism, parts being in section, and separated so as to show details of construction;

Fig. 17 is a side elevation of one of the ratchet plates;

Fig. 18 is a side elevation of one of the pawl plates; and

Fig. 19 is a sectional edge view of the inner and outer back-plates.

In the said drawings, 1 is the base upon which is mounted a frame 2, said frame being secured to said base by means of screws 3, Fig. 9, passing through apertures 3$^a$, Fig. 10, and held against lateral displacement thereon by pins 4 secured to said frame and entering the said base 1. The said frame 2 is provided with guide-ways 5 for the reception of a cross-head, Fig. 12. The cross-head 6 is provided with a journal bearing 7 for the reception of a shaft 8, to which shaft, at its forward end, is secured a printing-wheel 9, said wheel having equally spaced about its periphery raised portions in the form of words 10, said raised portions being suitably formed to enable the same to cut, score, or punch the material of a check or other paper. The printing-wheel, as shown in Figs. 4 and 5, is arranged close to the back of the face-plate 30, is fixed to its shaft 8, and has the raised characters 10 extending parallel with its axis of rotation. The peripheral wheel-characters correspond to the characters on the face-plate; and the printing-wheel is mounted so as to be easily turned in either direction.

A rod or plunger 11 has a teat 12 at its lower end fitting into a hole 13 in the cross-head 6, and a pinion 14, is secured to said rod adjacent said shoulder—Fig. 12. A strap 15, secured to said cross-head by means of screws 16, confines said pinion 14 against the top 17 of said cross-head. By means of this construction the rod 11 is mounted in two bearings, one being the centering aperture 13 in the cross-head and the other being an aperture in the strap 15, the pinion 14 and rod 11 being rotatable relatively to cross-head 6 and strap 15 and bodily movable with said cross-head in a vertical direction. The rod 11 passes through a bearing 18, Fig. 9, provided in the frame 2, and has secured to its upper end a handle 19 by means of a screw thread 20 on the end of said rod 11 and a tapped hole in said handle, there being interposed between a shouldered portion 21, in an upwardly projecting bearing 22 on said frame 2, and a shouldered portion 23 in said handle 19, a spring 24 which tends at all times to force said handle and consequently said rod 11 and cross-head 6 in an upwardly direction relatively to the frame 2 of the machine. Washer 25 is interposed between said shouldered portion 23 and the end of spring 24, said washer acting as a locking means between said handle and said rod and also as a bearing for the end of the spring, said handle being of relatively soft material. Viewing Figs. 5 and 9, a gear 26 is fixed to shaft 8, as by slabbing off said shaft and providing the aperture of said gear with a flat spot to coöperate with the slabbed portion of said gear. The gear 26 abuts against a shoulder on shaft 8 and is held firmly in place adjacent the back of the cross-head by means of a nut 26'. The gear 26 is of suitable size and pitch to mesh with the pinion 14 carried by rod 11. Thus, the printing-wheel is under control of the operator through the medium of handle 19, rod 11, pinion 14, gear 26 and shaft 8, and can be reciprocated by the spring 24 and pressure applied to the handle, and can also be turned or rotated clockwise and counter-clockwise by said handle.

Mounted on the base 1, see Figs. 9, 9$^a$ and 10, is a die 27 of a very hard material, preferably hardened tool steel, and having its upper face provided with cutting-blades or ribs 27$^a$, arranged diagonally and in parallelism, correspondingly with the cutting-blades or ribs of the printing-wheel. The ribs of the die 27 and of the wheel 9 are arranged so as to alternate with each other, thus enabling the ribs of one to enter the slots of the other. Moreover, the ribs of the die 27 are slightly deeper than the ribs of the wheel-characters, so that, when the two are in coöperative engagement, the ribs of the die 27 will bottom in the slots of the wheel-characters thus preventing the ribs of the latter from being jammed, spread, dulled, or otherwise injured. However, as will be presently shown, my construction is such that substantially all shock or jar, caused by a heavy blow upon the handle, will be absorbed. This prevents the paper from being improperly cut and also avoids shocks or jars which might be harmful to the mechanism. The printing-wheel, or its characters, is made of a softer metal than the die, resulting in causing the die-blades or ribs to maintain the blades or ribs of the printing characters in good cutting condition. Experiments have shown that use increases efficiency. The die 27 is secured to a block 27' by means of screws 29 tapped into the said die and passing through apertures 29' in said block 27', said apertures being slightly elongated, lengthwise of said block, to permit adjustment between said block and said die for the purpose of procuring perfect registrations between the ribs or blades of the die and the characters 10 on wheel 9. The block 27' is set in the base 1 in such a manner as to have no lateral movement whatsoever, but to be capable of movement in a vertical direction, there being interposed between the bottom of the recessed portion 28 of said base and said block 27', a buffer 29' of some elastic material such as rubber or the like, to absorb the shock of a blow imposed thereon by coöperation of wheel 9 and die 27.

Figure 1:
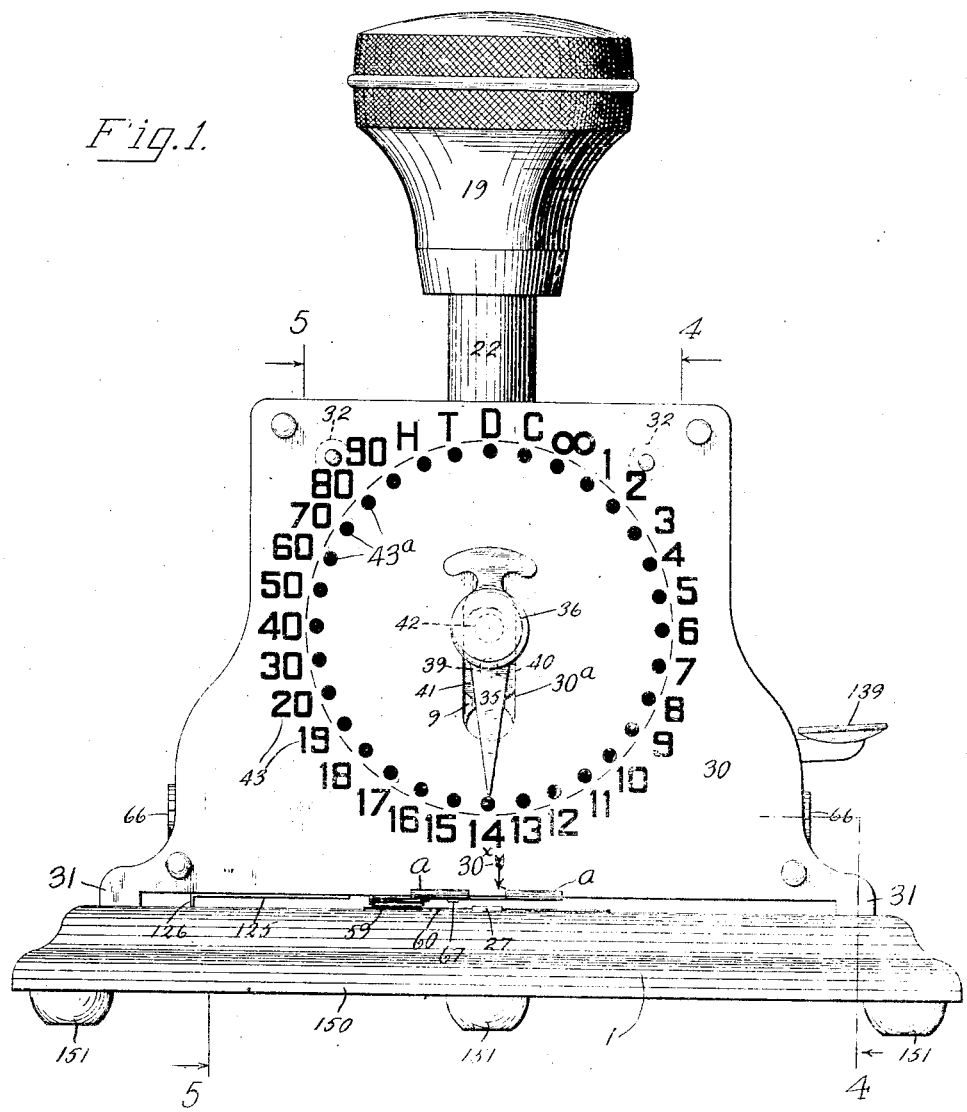
Figure 1 is a front elevation of a machine embodying my invention.

The mode of securing proper coöperation between the printing-wheel and die and the structure thereof having been set forth, the selecting means, for characters and words and combinations thereof, will now be described. Secured to the face of the frame 2, Figs. 1, 4 and 5, is an index or face-plate 30, having downwardly projecting lugs 31 coöperating with recesses 31' in the base 1 and having ball shaped studs 32 near its upper edge on its inner surface, coöperating with spring detents 33 secured to the frame by screws 34. The method of securing this plate is to insert the downwardly projecting lugs 31 into the apertures 31ᵃ and then force the plate back until the balls 32 snap into the sockets of detents 33. By inserting an instrument, such as a knife-blade, or a thin coin or disk, into the slot 18ᵃ, Fig. 2, at the top of the frame 2 and twisting or turning the same, the faceplate 30 can be forced outwardly and removed by overcoming the frictional hold of the detents 33. This provides a convenient and quick way of removing the faceplate to inspect the machine and replace the inking rolls, presently described. Loosely mounted in an elongated, vertical slot 30ᵃ in said index-plate is an indicator or pointer 35 having a hub 36 thereon larger in diameter than the width of the slot, said hub being shouldered, as at 37 in Fig. 5, and having a flange 38 secured near the inner end of the shoulder 37, so that the plate 30 is between the flange 38 and the indicator 35, said indicator and flange being free to revolve in said slot 30ᵃ and also to have freedom of vertical motion therein. The flange 38 has secured thereto an inwardly projecting pin 39, which coöperates with a hole 40 in a hub 41 on the wheel 9, shaft 8 also being provided with a hole 42 for the reception of the end of the shouldered portion 37 projecting inwardly beyond the flange 38. It can be seen that when the plate 30 is in position on the frame 2 with the shank 37 of the hub 36 in place in hole 42 and the pin 39 in place in the hole 40, the indicator will be in fixed relation to the characters on said wheel 9 and, therefore, by properly placing characters 43 on said plate 30, any word or series of characters on said wheel will be brought into working position by revolving the handle 19 until the indicator 35 points to the proper word or characters on said plate 30. The characters on the face-plate 30 are preferably numerals corresponding in value with the word-characters on the wheel 9, the characters on plate 30 being circularly arranged and correspondingly located relatively to the characters on the wheel. In order to accurately bring the wheel-characters into printing position, the plate 30 also has indicating spots or dots 43ᵃ opposite each member with which the pointer 35 coöperates. The great difficulty, in this character of machine, however, is to set the printing characters on the wheel accurately with reference to the die and positively hold the position selected so as to cause the blades of the die and wheel to register properly. I accomplish the results in a very simple manner by employing, what may be termed, a preliminary centering or alining means yielding to forcible rotation of the wheel, and a secondary or rigid centering or alining means incapable of displacement during operation. As shown in Figs. 3 and 9, a spring finger 44, provided with a cupped depression forming a teat 45, is secured to the cross-head 6 by a screw 46 passing through the base of said finger and held against displacement by abutting a face 47 of said cross-head. The teat 45 of the finger piece 44 coöperates with conical depressions 48 in the back end of the wheel 9 and, owing to the fact that such teat is spherical and of no great depth, it readily slips in and out of successive depressions 48 as the wheel 9 is rotated manually. By this method of preliminary alinement or centering, the operator will "feel" when successive characters on the wheel 9 are in proper alinement to the die in the base of the machine, as indicated by the pointer; but such resistance as may be offered by said spring finger is not great enough to hinder the ready manual rotation of the wheel 9. Instead of this means for producing the results stated, I may employ the means disclosed in my said application. Journaled in the cross-head 6 is a pin or stud 49, Fig. 4, having a conical point 50, accurately fitting the conical depressions 48 in the wheel 9, said pin having a flange 51 and a reduced extension 52 passing through a plate 53 secured to the cross-head 6. A spring 54, fitted into a recess 55 of the cross-head, normally holds the pin 49 away from the wheel 9. Secured to a portion 56 of the frame work is a spring 57 of considerable strength, the free end 58 of such spring being in the path of movement of the reduced portion 52 of the pin 49, and acting thereon as a cam face, to force the pin 49 into a depression 48 of the wheel 9. It is obvious that the conical shaped point of the pin 49, seated in the conical shaped depression 48 of the wheel 9, and held there under the action of the spring 57, will prevent any angular displacement of the wheel 9 with respect to the die in the base, and that such displacement is not possible except by the employment of great force. Nevertheless, if by any mischance, or through carelessness of the operator, the preliminary centering device is not wholly in one of the conical depressions 48 of the wheel 9 and the point of the pin 49 is not in position to accurately enter a depression 48 in wheel 9, the spring 57 has sufficient power to force said pin into such depression, even though it strikes the outer edge of the wall thereof, thus compelling the wheel to automatically become accurately set before its character face engages the die. Hence, through the medium of pointer 35 and teat 45, the operator may produce a preliminary setting of the printing wheel which will be accurate, or approximately so; but, if only approximately so, the centering device, including pin 49, will automatically and positively set the wheel accurately for coöperation with the die.

One of the chief requirements of a machine of this character is that the check or other paper to be printed or marked shall be accurately fed and guided. To secure equal spacing between words it is necessary either that all the words shall be of the same length, which would make uniform feeding for successive words possible, or, that the amount or the distance which the check or other paper shall be fed, shall vary to compensate for the varying lengths of words to be impressed in or on the check or paper. It is a well known principle that anything, when set in motion, has a tendency to keep in motion, and it is therefore essential that, in a machine of this kind the feed mechanism shall be positively stopped at the critical point in its operation. In my machine a feed mechanism has been produced which will accurately feed a check or other paper placed therein rapidly, true to gage, will compensate for varying lengths of words, and will positively come to a stop when such length of feed has been accomplished.

The feed mechanism, as illustrated in the drawings, comprises essentially a feed-roller of frictional material, and an idler roller 60, said idler having trunnions 61 on the ends thereof which fit into suitable recesses in the base 1, and allow said idler to rotate freely therein. The feed-roller 59 is mounted on a shaft 62, Figs. 5 and 15, carried in arms 63 and 64, journaled on a shaft 65 mounted in the frame 2, by means of hollow screws 66, forming adjustable bearings for said shaft 65. The roller 59 is rigidly secured on the shaft 62 as is the pinion 67, in any suitable way, said pinion being composed of several thicknesses of sheet metal accurately blanked and mounted on a sleeve which acts as a hub therefor. The pinion 67 meshes with a gear 68 fixed to a sleeve 69 and being embraced on either side by fixed ratchet wheels 70 and 71, see Figs. 15 to 17. The sleeve 69 is revolubly mounted on the enlarged portion 72 of the shaft 65. The gear 68 and its adjacent ratchet wheels 70 and 71 are driven and controlled in the following manner: Securely mounted on an enlarged portion 73 of the shaft 65 is a disk 74 carrying the opposed pawls 75 and 76 pivoted thereto at 77 and 78, respectively, and controlled by springs 79 and 80 riveted to said disk 74. Securely mounted on a sleeve 81 on the opposite side of the pinion 68 and ratchet 71 is another disk 82 carrying opposed pawls 85 and 86, controlled by springs the same as the other disk shown in Fig. 18. Mounted on the same sleeve 81 are gear 83 and a circular plate 84 which, when the pawl carrying disk 82, the gear 83, and the plate 84 are all assembled on the sleeve 81, form a compact and unitary structure. When the gear 83 is rotated in one direction, the pawl sets 85 and 86 engage in the teeth of the ratchet wheel 71 and rotate the same, the gear 68 and the ratchet 70 rotating therewith through the medium of the sleeve 69, the pawl sets 75 and 76 on the disk 74 sliding over the ratchet teeth 70. When the gear 83 is revolved in the opposite direction, the pawl sets 85 and 86 slide over the inclined faces of the teeth on the ratchet 71 while the pawl sets 75 and 76 engage the teeth on the ratchet 70 thus holding said ratchet, the gear 68, and the ratchet 71 against return rotation. The gear 68 being in engagement with the gear 67 imparts thereto rotation in one direction only, and as the gear 67 and the feed-roller 59 are both rigidly secured to the shaft 62, the feed roller 59 in consequence thereof can have rotation in one direction only. The shaft 8, as before noted carries the nut 26', see Fig. 5, and beyond the same a loose sleeve 87, which acts as a spacing member, is slipped thereon and then the shaft has applied thereto the feed-rack operating mechanism and the variable operating cam-plate, as presently described.

Loosely mounted on the portion 88 of the shaft 8, beyond the sleeve 87, Figs. 6 and 7, and adjacent to the sleeve 87 is a plate 89 having lateral extensions 90, notched at 91 for the reception of the ends of springs 92, said springs being secured at their other ends to ears 93 on the horizontal portion 94 of a slide 95, having an elongated slot 96 therein which allows it to move with respect to the shaft 8. At the lower end or tail 97 of the slide 95, a portion 98 is bent over at a right angle thereto to provide for a rack 99 being cut thereon. Projecting in an opposite direction to said rack 99 is a pin 100. The rack 99 meshes with gear 83 previously described and is held in such engagement by means of the pin 100 sliding against an inner back-plate 101, said inner back-plate being secured to the frame 2 in any suitable manner. Mounted on the horizontal portion 94 of slide 95, is a dog 102, said dog being loosely held on said horizontal portion 94 by a stud-plate 103, a portion 104 of which passes through an aperture 105 in said dog to center the latter, said stud being reduced at 106 where it passes through the portion 94 of plate 95 and having a head to secure it to said slide-portion 94. The cylindrical portion 107 of said stud, supports a spring 108, having downwardly projecting parallel arms 109, a plate 110 holding said spring in place on the reduced portion 111 of said stud, a head being formed on the end of the latter to hold the plate 110. The dog 102 is provided with a nose 112 and two ears 113. See Fig. 8. The arms 109 of the spring, at their ends, normally bear against shoulders 114 of the slide-member 94, said shoulders 114 being in the same vertical plane as the forward face of the ears 113 of the dog, so that the nose 112 of the dog normally points rearwardly parallel with the shaft 8, but is capable of rotative displacement relatively to the stud-plate 103 and against the action of the spring 108 in opposite directions.

The variable space-feed cam-plate, or controller, 115 is clamped to the end of the shaft 8 by means of a large screw-head 116. This plate is divided peripherally into a number of cam-projections or rests 117 equal to and corresponding with the number of words or groups of characters 10 spaced about the wheel 9. The rests 117 are at various radial distances from the center of the plate, such distances being proportional to the number of letters comprising the words or characters on the wheel 9, or the length of the word or group of characters, plus the space or distance which is to be uniformly maintained between words or characters printed in succession. Viewing Fig. 3, the relation between the printing-wheel characters 10 and the rests on the controller cam 115, will be understood; but, this relation is also fixed by the position of the pointer 35 and the point at which the impression is to be made, the latter being, substantially, the longitudinal center of the die-blades 27ª, which is also in the vertical plane of the longitudinal axis of the printing-wheel. In other words, when the pointer is in the position of Fig. 1, the wheel 9 has been turned to present its character "fourteen" to printing position (this being one of the longest characters) and the controller-cam has been turned with the wheel so that one of its highest rests 115ª is in, substantially, the vertical plane cutting the longitudinal axis of the shaft 8 of the wheel 9. Said rest is, therefore, in position to be engaged by the toe 112 of the feed-slide operating dog 102, after the plunger 11 and wheel 9 are forced down for a printing operation, as will be described presently. It will be thus understood that the controller-cam 115, printing-wheel 9 and pointer 35, have a predetermined fixed relation and that they all move together with reference to the characters on the face or dial-plate 30. In my machine shown, and in accordance with my present invention, the dial-plate has 32 characters, and the printing-wheel has 32 characters corresponding thereto, most of which vary in length, and the controller-cam has rests which are at different radial distances from the center of said wheel, corresponding to the length of the different wheel-characters; but, some of said characters are of the same length as "fifty" and "sixty" and where they come together, or beside each other, on the periphery of the wheel, the corresponding rests on the cam are simply elongated circumferentially, or merged, as at 115ˣ. "Sixteen" and "seventeen" are also the same length and are adjacent each other on the wheel, and the corresponding cam-rests are merged, as at 115ᶜ.

The feed action is as follows: When the handle is depressed, carrying with it the cross-head 6 and the shaft 8, the plate 89 is carried with the shaft 8 and the slide 95 is forced downwardly under the action of the springs 92. The rack 98, being in engagement with the gear 83, between the disks 82 and 84, the latter are turned, together with the pawls on disk 82, which slide over ratchet 71; but, owing to the direction of rotation, the gear 68 will remain stationary under control of the pawls 75 and 76 acting on the ratchet 70. When the handle is released and rises under the impulse of spring 24, raising with it the cross-head 6 and shaft 8 and the controlling feed-cam 115, one of the rests 117 will engage with the nose 112 of the dog 102, carrying said dog and all attached parts upwardly for a distance corresponding to that of said rest 117 from the center of the shaft 8. This action will cause the rotation of the gear 83 through a corresponding arc, and the pawls 85 and 86, acting on the ratchet wheel 71, will revolve the gear 68 through a corresponding arc, said gear in turn revolving the gear 67 attached to the shaft 62 and the feed roller 59 attached to the same shaft through a proportional arc. Thus, it will be seen that the amount of feed is automatically controlled by the cam-plate 115.

It should be understood that the springs 92 normally tend to hold shaft 8 and slide 95 in coöperative relation. Hence, when the plunger is driven downwardly, the shaft 8, operating upon plate 89, will cause the springs 92 to drive the slide 95 downwardly under yielding pressure. If there is any tendency on the part of the slide to rebound, it will be overcome by said springs 92, which will retain said slide; but, if the slide is not at its lower limit when the shaft 8 is reaching its lower limit, the latter will force the slide downwardly by engaging the wall at the lower end of the slot 96. This action insures the complete and proper travel of the feed-slide 95. As the shaft 8 returns, the springs 92 will retain the slide 95 at its lower limit of travel (in engagement with the base 1) until a rest 117 of the controller-cam 115, engages the toe 112 of the dog 102, whereupon the coöperative action of toe and rest will lift the slide 95, and its rack-bar will operate to rotate the feed-roller 59 as described. When the shaft 8 and plunger reach their upper limit, there is a clearance left between the shaft and upper end of slot 96, which is necessary to enable the slide 95 to resume its normal position shown in Fig. 6, when the controller-cam is turned for a new feed position corresponding to the successive character, on wheel 9, which is turned to operative position. It will now be understood that the return stroke of the plunger and bodily moving cam 115 is not, as a whole, a feed-stroke, since the cam, even when its greatest radial rest is in position, for function, has a movement downwardly more than sufficient to cause said rest to clear the toe 112, which is turned to be in operative line therewith on the return stroke of the cam. Hence, the cam will move upwardly a proportional distance before engaging the toe 112, this last motion of the feed-slide being allowed and necessary to insure clearance of the character on the printing-wheel from the check, after an impression has been made. This also enables uniform and regular spacing to be produced between impressions, regardless of the length of the latter.

It should now be noted that the dog 102 is capable of movement, in opposite directions around its supporting stud, under control of the spring 108, the arms 109 of which tend to return the dog to its normal coöperative position relatively to the controller-cam 115 and hold the same in such position. Consequently, when the cam 115 rises, as above explained, one of its rests 117 will always engage the toe 112 of said dog, causing the latter, through stud-plate 103 and connected parts, to lift the slide 95 and cause it, as described, to produce the proportional feed of roller 59. After the feed-movement thus produced, the cam 115 will be turned, with the printing-wheel, for a successive feed action. When thus turned, the cam will turn the dog 102, by engagement of a higher rest 117 thereof with the toe 112, thus releasing the slide 95 and permitting the springs 92 to move the latter downwardly until the upper end of slot 96 engages the shaft 8. The parts are now in position for a successive operation; but, the dog 102 is being held from normal position, because its toe 112 is engaged with the back of the cam 115. When the latter is again driven downwardly by the plunger for a new printing stroke of the wheel 9, the cam passes the toe 112 which is at once returned to normal position, by one or the other of spring-arms 109, in the path of operation of the cam 115. If the successive character to be printed is of the same length as the one just printed and the corresponding cam-rest is a merged one, as $115^x$ or $115^e$, the toe 112 may not be turned out of coöperative position, but may slide from one to the other, so that said toe will remain in normal position and await the return of the cam 115 from its lower position after the printing stroke. This action, of course, will depend entirely on how the operator manipulates the machine. The mechanism employed for stopping or positively arresting the feed-wheel at the proper instant comprises a lever arm 118, Figs. 5 and 15, fulcrumed on the shaft 65 next to arm 63, and having at one extremity a brake-segment 119, having the same conformation as the periphery of the feed wheel. At its opposite end lever 118 is pivoted at 120, to the lower end of a link 121, having in an offset portion a slot 122 for the reception of a pivot 123 secured to an ear or lug 124 carried by the cross-head 6. When the cross-head is in its upper position, the pivot 123 presses against the upper end of the slot 122 in such a manner as to exert an upward pull on the pivot 120 and cause the brake 119 to press firmly on the feed-roll 59 to hold the same against rotation. As the brake-lever is proportioned and mounted, the tendency is for the brake 119 to normally rest upon the feed-roller 59 and thus prevent the same from having movement during the downward movement, and ineffective stroke of the rack-bar 99; but, this is not essential, as the link 121 can be so proportioned as to balance the brake-lever and hold the brake 119 suspended normally free from the roller 59. This will be understood upon viewing Fig. 5. The essential feature of, and important operation resulting from, this structure is that, when the plunger and cross-head are at the upper extreme position, the brake 119 will be firmly applied to hold the roller 59 positively against movement, and when said parts are at their lower extreme position, the brake will be positively lifted and held from engagement with the feed-roller. Intermediate positions of the pivot pin 123 may be utilized, if desired, by creating friction between said pin and link 121, to cause the pin in moving down to slightly lift the brake, and in moving up to cause the brake to apply slight friction to the roller. This will prevent the roller from overfeeding due to inertia. Therefore, as all the movement of the feed roller is produced during the latter portion of the upward movement of the cross-head 6, and the braking is done at the extreme end of said movement of the cross-head, it follows that the braking or stopping of the feed roller takes place positively and exactly at the instant required. This is an important feature of my invention, and too much stress cannot be placed thereon, since upon it depends, in great measure, the exact results obtained by me with my machine.

To secure perfect alinement of the various words or group of characters stamped or impressed into the check, it is essential that the check or other paper, fed through the device, shall be advanced in an absolutely straight line of predetermined location with reference to a given line or position on said check. For this purpose a duplex gage and coöperating paper support are provided, consisting of a plate 125, Fig. 10, having a down-turned gage-flange 126 terminating in a toe 127, Fig. 5, said toe being adapted to slide in a groove 128 formed in the base 1. The plate 125 is secured to a rod 129, supported by the inner back-plate 101 by riveting or in any other suitable manner, by loops 130 formed of a springy material which will enable them to frictionally hug the rod 129, the plate also being provided with a hook 131 formed on the horizontal portion thereof, said hook being adapted to coöperate with a side wall or upturned guiding-flange 132 of the check-support 133, having apertures at opposite sides to receive the rod 129 on which said support is free to swing vertically and slide longitudinally. The gage-flanges 126 and 132 are in alinement, and movements of support 133 and the gage-plate are produced together so as to enable the line on the check, along which the printing is to be done, to be set accurately relatively to the characters on the printing-wheel which are to be successively impressed. This adjustment of the supporting and gage-plates is with reference to the longitudinal center of any character on the printing-wheel when said character has been turned to printing position, and said center of the printing-character is determined by the operative by reference to the arrow-head 30ˣ on the face-plate 30, said head being applied to indicate the right-margin of the die 27ᵃ and coöperating wheel-character. Having set the supporting and gage-plates in proper position for guiding a check through the machine, the position obtained will be held by the frictional device consisting of plate 125ᵃ secured to upturned flange 126ᵃ of support 133, said plate having a spring-finger 127ᵃ bearing on the rod 129 and an opposite, similar spring-finger 128ᵃ, Figs. 4 and 10, bearing on said rod. These spring-fingers engage the rod with sufficient friction to hold the support in any position; and, it will be understood that said support may be turned up against the back of the machine for shipping or when not in use.

Having set the gages so as to produce the proper printing line on the check, it is important to maintain the check, during its feed-movements, in perfect line-position, so as to cause the printing characters to be impressed in a straight line on the check. This is accomplished automatically by forming the feed-rollers as shown in Fig. 11. Therein the idler 60 is shown as provided with a tapered end portion 134 which coöperates with the feed-roller 59, the taper being toward its left end, or toward the gage-flanges 126 and 132. The body of the idler 60 engages the check on opposite sides of, and in line with, the character impressed by the printing-wheel. By this arrangement, the check is fed with a constant tendency toward the gage-flanges and is, consequently, kept in perfect line while being printed. This is due to the difference in surface speed imparted to the check on opposite sides of the coöperating or engaged surfaces of the feed and idler rolls.

To prevent the check, after being printed, from adhering to, or following, the printing-wheel in its upward movement, I provide a stripper-plate 135 composed of resilient material, the same being rigidly secured at 135ª to the inner back-plate 101, by upturned flanges 135ˣ, see Figs. 9 and 10, in such position as to provide a clear passage thereunder for the check as it is guided to position over the support 133. The stripper-plate is provided with two forwardly extending, upturned spring toes $a$, which protrude beyond the face-plate 30, Figs. 1 and 4, and prevent the check from engaging said face-plate as it is being entered into the machine, and also prevents said face-plate interfering with the proper feed of the check. The stripper-plate is provided with a slot $a'$ for the passage of the printing-wheel into coöperation with the die, and with an aperture $a^2$ for the passage of the feed-roller 59 into coöperation with the conical portion 134 of the idler 60. An aperture $a^3$ also permits the passage of the lower end of the slide 95 into engagement with the base 1. At its opposite sides the stripper-plate may be upturned as at $a^4$, so as to create no drag upon the check. The resiliency of the plate 135 permits the same to yield when portions of the printing-wheel contiguous to the placed character engage it, and as the wheel recedes, with the check tending to cling to it by reason of the slits cut therein, the stripper plate holds said check down upon the base and in proper position.

The feed-roller 59 is normally at rest upon the idler, as shown in Fig. 11, and must be raised for the insertion of a check to its initial position. For this purpose shaft-carrying arm 64 is extended backwardly as at 136, Figs. 3 to 5, where it engages with a lever 137, Figs. 4 and 10, pivoted to the inner back-plate 101, at 138 and terminating at its free end in a thumb-piece 139. Said backwardly extending portion 136 of the arm 64 is acted upon by one end of the spring 140 coiled about a sleeve 141 carried by the shaft 65, the other end of which spring abuts on the lug 56 forming a part of the frame 2 of the device. The action of this spring is to force the backwardly extending portion 136 of the arm 64 in an upwardly direction and, consequently, to force the shaft 65 with its feed roll in a downwardly direction. The feed-roll, in order to properly perform its feeding function, should have a normal predetermined pressure upon the idler roll, and spring 140 is selected and coiled with a view to producing such tension which is sufficient to cause a positive feed of the check and to prevent the latter from slipping under ordinary conditions of use and operation. The feed lifting-lever 137 is offset near its pivoted end and extends within a slot 137ª, Figs. 4 and 9, to the outside of the frame, the top and bottom walls of said slot affording stops for the movements of the lever, which latter normally rests upon the arm-extension 136 near said top wall. The lower wall limits the downward movement of said lever and upward movement of said feed-roll.

It is important, in machines of this character, to properly and uniformly ink the characters on the printing-wheel, and one of the great difficulties has been that the inking-rolls become stuck on their shafts or pivots, thus presenting the same portion of the rolls to the characters at all times. This has caused a flat spot to become worn on the inking rolls and also the exhaustion of the supply of ink at that spot, resulting in insufficient inking and also in smearing the characters. Good impressions could not, therefore, be obtained and parts of the impression would be found to be heavier than others. To overcome these faults and difficulties, I have devised means as shown in Figs. 2, 9, 12 and 13 wherein inking rolls 142 are composed of a soft, yielding and compressible substance or material capable of absorbing the ink and yielding it to the printing characters. These rollers are so mounted and held forcibly, but yieldingly, against the printing-wheel as to eventually have worn therein ribs or raised portions 148 separated by depressions or grooves, both extending longitudinally of the rolls. That is to say, it has been found that after the machine has been in use for some time, the ribs and grooves will be produced in the circumference of the rolls and that prior thereto the yielding character of the roll material enables the same to adhere or cling to the printing-wheel in such manner as to cause the positive rotation of the rollers without any relative or independent movement thereof. This action, after continued use, becomes more positive as the ribs and grooves become more prominent. For the sake of illustration, this feature has been magnified in the drawings, Figs. 2, 4 and 5. The inking rollers are mounted on pins 144, carried by arms 145 pivoted to the cross-head 6 by means of screws 146, these arms being connected by a spring 147 secured to ears 148 on said arms 145, the tendency of said spring being to constantly hold the rollers 142 forcibly but resiliently engaged with the printing-wheel 9. The inking rollers are easily and quickly removed by inserting a pencil, or some other slender instrument, against the lug or hook 149 of an arm 145 and pressing the latter aside against the force of the spring 147. The roll will slide off its pin easily, being held in place by the face-plate 30 and friction against the printing-wheel. A new roller may then be placed. As shown in Fig. 13, the ears 148 may be independent of the arms 145 and adjustable thereon, so as to increase the tension of the spring, or adjust said tension, to cause the inking rollers to bear with the required amount of friction upon the printing-wheel. This is accomplished by forming the ears 148 on slides 148ᵃ secured to the arms 145 and adjustable transversely of the latter by screws 148ˣ passing through elongated slots 148ᶜ in said arms, the latter also having a groove 148ᵉ for guiding and retaining the slide from slipping from place. Increase of tension will decrease any tendency to independent movement of the inking rollers, and also decrease tendency to overthrow in manipulating the printing-wheel. Uniform and sufficient inking are accomplished by my construction.

To the bottom of the base 1 is secured a plate 150 by means of screws attached to feet 151. These feet 151 are, preferably, made of rubber or some other soft material so as to deaden the sound of operation and avoid marring or scratching the desk or table upon which the machine is placed; and an outer back-plate 152 may be secured to the inner back-plate 101, as a covering for the slots and apertures in the latter, said plate 152 having a plurality of headed studs 153, adapted to enter corresponding keyhole slots 154 in the plate 101, the latter also having, near its top edge, an outwardly projecting teat 155 which coöperates with a depression 156 in the plate 152. When all the parts of the machine have been properly put together, the back-plate 152 is applied by entering the studs 153 into the hole-parts of the slots 154 and then lifting said plate until the teat 155 snaps into the depression 156. To remove the plate 152, a knife-blade or sharp tool should be inserted between the two plates beside the teat 155 and downward pressure exerted on plate 152.

It can now be seen and readily understood that I have provided, in as finite space as is practically possible, a combination of means and mechanisms by which accurate and proper check writing can be accomplished, and by which the writing of the check is protected and prevented from being altered or tampered with in any way. The movement of all the parts is accomplished in the most simple manner through the medium of a prime mover or plunger in coöperation with a returning or expansible spring. The parts are so arranged as to produce a compact, strong and comparatively simple mechanism which is effective, easily repaired, easily assembled and easily gotten at for inspection; and, an important feature of my invention is the arrangement of the feed-controlling cam on the same shaft with the printing-wheel, and the two capable of being simultaneously manipulated by rotation of the plunger. Compactness and strength are secured by having a single short shaft carrying the printing-wheel-controlling cam and various other parts, which shaft in turn is carried by the cross-head with its longitudinal axis in the same vertical plane with the longitudinal axis of the plunger, though the plunger and the shaft are arranged at a right angle to each other. Further strength is attained by so constructing the cross-head as to be guided in the frame and confined to right-line reciprocations therein; and it is an important feature of my invention that the plunger is capable of rotation relatively to the cross-head, and is also capable of imparting to the cross-head its necessary vertical movements. By so disposing the parts of the machines just mentioned, ample room is given in the lower portion of the machine-frame for the feeding and braking mechanism, as well as the stripper plate and inking-rollers. This compact arrangement of parts I consider an important feature of my invention and lay stress upon the same at this point with a view to laying claim thereto.

Having thus described my invention, what I claim and desire to secure by Letters Patent is:

1. In a check writer, a printing wheel, a vertically movable cross head carrying said printing wheel, a feeding device engaging the upper face of the check for feeding the same, mechanism actuated by the cross head for giving a feeding movement to said feeding device, and a controlling cam associated with the printing wheel for determining the extent of movement imparted to the feeding device.

2. In a check writer, a printing wheel, a vertically movable cross head carrying said printing wheel, a feeding device engaging the upper face of the check for feeding the same, mechanism actuated by the cross head for giving a feeding movement to said feeding device, a controlling cam associated with the printing wheel for determining the extent of movement imparted to the feeding device, and means whereby said feeding device may be raised from the check for permitting a free movement of the check for entering or withdrawing the same.

3. In a check writer, a printing wheel, a vertically movable cross head carrying said printing wheel, a feeding device engaging the upper face of the check for feeding the same, mechanism actuated by the cross head for giving a feeding movement to said feeding device, a controlling cam associated with the printing wheel for determining the extent of movement imparted to the feeding device, and means for simultaneously shifting the printing wheel and the controlling cam associated therewith.

4. In a check writer, a printing wheel, a vertically movable cross head carrying said printing wheel, a feeding device engaging the upper face of the check for feeding the same, mechanism actuated by the cross head for giving a feeding movement to said feeding devices, a controlling cam associated with the printing wheel for determining the extent of movement imparted to the feeding device, a spring for normally raising said cross head, and means accessible to the operator whereby said cross head may be moved downwardly against the tension of said spring.

5. In a check writer, a printing wheel, a vertically movable cross head carrying said printing wheel, a feeding device engaging the upper face of the check for feeding the same, mechanism actuated by the cross head for giving a feeding movement to said feeding devices, a controlling cam associated with the printing wheel for determining the extent of movement imparted to the feeding device, a plunger rotatably connected to said cross head for moving the cross head downwardly, a spring for raising the cross head, and means operated by the plunger in the rotation thereof for shifting the printing wheel and the associated controlling cam.

6. In a check writer, a printing wheel, a vertically movable cross head carrying said printing wheel, a feeding device engaging the upper face of the check for feeding the same, mechanism actuated by the cross head for giving a feeding movement to said feeding devices, a controlling cam associated with the printing wheel for determining the extent of movement imparted to the feeding device, a plunger rotatably connected to said cross head for moving the cross head downwardly, a spring for raising the cross head, means operated by the plunger in the rotation thereof for shifting the printing wheel and the associated controlling cam, an index plate, a pointer having fixed relation relative to the printing wheel and shiftable therewith for indicating the printing character positioned for printing.

7. In a check writer, a printing wheel, a vertically movable cross head carrying said printing wheel, a feeding device engaging the upper face of the check for feeding the same, a reciprocating member for giving feed movements to said feeding device, means for moving the cross head downwardly for causing the printing wheel to print the check, means operating with the cross head for moving said reciprocating member to a predetermined fixed point, and means operating upon the upward movement of the cross head for moving said reciprocating member to an extent controlled by the length of a word being printed for imparting the feeding movements to said feeding device.

8. In a check writer, a printing wheel, a vertically movable cross head carrying said printing wheel, a feeding device engaging the upper face of the check for feeding the same, a reciprocating member for actuating said feeding device, yielding means for moving said reciprocating member to a fixed point during the downward movement of the cross head, and positive means actuated by the cross head for moving said reciprocating member for imparting the feeding movements to said feeding device.

9. In a check writer, a printing wheel, a vertically movable cross head carrying said printing wheel, a feeding device engaging the upper face of the check for feeding the same, a reciprocating member for actuating said feeding device, yielding means for moving said reciprocating member to a fixed point during the downward movement of the cross head, and positive means actuated by the cross head for moving said reciprocating member for imparting the feeding movements to said feeding device, said last-named means including a controlling cam associated with the printing wheel and determining the extent of movement of the feeding device.

10. In a check writer, a printing wheel, a vertically movable cross head carrying said printing wheel, a feeding device engaging the upper face of the check for feeding the same, a reciprocating member, for actuating the feeding device, a controlling cam connected to the printing wheel and movable up and down with the cross head, a yielding dog carried by the reciprocating member and overlying the controlling cam, springs for yieldingly pressing said reciprocating member in a downward direction, said reciprocating member being moved by the controlling cam through the engagement thereof with the dog for imparting the feeding movements to the feeding device.

11. In a check writer, a printing wheel, a vertically movable cross head, a shaft mounted in the cross head and carrying said printing wheel, a controlling cam fixed to said shaft, a feeding device for engaging the upper face of the check, a reciprocating member for actuating the feeding device, springs for normally forcing said reciprocating member downwardly, a yielding dog carried by said reciprocating member and overlying said controlling cam, whereby said controlling cam in the upward movements of the cross head engages the reciprocating member and operates the feeding devices.

12. In a check writer, a printing wheel, a vertically movable cross head, a shaft mounted in the cross head and carrying said printing wheel, a controlling cam fixed to said shaft, a feeding device for engaging the upper face of the check, a reciprocating member for actuating the feeding device, springs for normally forcing said reciprocating member downwardly, a yielding dog carried by said reciprocating member and overlying said controlling cam whereby said controlling cam in the upward movements of the cross head engages the reciprocating member and operates the feeding device; an index plate having an elongated slot therein, a pointer in front of said index plate, a supporting shank for the pointer extending through said slot and removably engaging the shaft, and means for holding said pointer in a predetermined position relative to the shaft.

13. In a check writer, a printing wheel, a vertically movable cross head carrying said printing wheel, a rotating feed roller, a reciprocating member, a ratchet mechanism intermediate said reciprocating member and said feed roller, whereby movements of said reciprocating member in one direction impart feed movements to said feed roller, mechanism actuated by the cross head for imparting movements to said reciprocating member, and a controlling cam associated with said printing wheel for determining the extent of movement of said reciprocating member.

14. In a check writer, a printing wheel, a vertically movable cross head carrying said printing wheel, a rotating feed roller, a reciprocating member, a ratchet mechanism intermediate said reciprocating member, and said feed roller, whereby movements of said reciprocating member in one direction impart feed movements to said feed roller, mechanism actuated by the cross head for imparting movements to said reciprocating member, a controlling cam associated with said printing wheel for determining the extent of movement of said reciprocating member, and a brake controlled by the movements of the cross head for preventing overthrow movements of said feed roller.

15. In a check writer, a printing wheel, a vertically movable cross head carrying said printing wheel, a rotating feed roller, a reciprocating member, a ratchet mechanism intermediate said reciprocating member and said feed roller, whereby movements of said reciprocating member in one direction impart feed movements to said feed roller, mechanism actuated by the cross head for imparting movements to said reciprocating member, a controlling cam associated with said printing wheel for determining the extent of movement of said reciprocating member, a plunger rotatably connected to the cross head for moving the same downwardly, a spring for raising the cross head, and means actuated by the rotation of the plunger for positioning the printing wheel and controlling cam.

16. In a check writer, a printing wheel, a vertically movable cross head carrying said printing wheel, a rotating feed roller engaging the upper face of the check for feeding the same, a vertically reciprocating member, a ratchet mechanism disposed between said vertically reciprocating member and said feed roller whereby the upward movements of said reciprocating member only impart movements to the feed roller, and means carried by the cross head for imparting an upward movement to said reciprocating member corresponding to the length of the word being printed.

17. In a check writer, a printing wheel, a vertically movable cross head carrying said printing wheel, a rotating feed roller engaging the upper face of the check for feeding the same, a vertically reciprocating member, a ratchet mechanism disposed between said vertically reciprocating member and said feed roller whereby the upward movements of said reciprocating member only impart movements to the feed roller, a spring for normally depressing said vertically reciprocating member, a yielding dog carried by said reciprocating member, a controlling cam associated with the printing wheel and carried by the cross head and underlying said dog whereby the upward movements of the cross head cause the controlling cam to raise the reciprocating member a distance corresponding to the word being printed.

18. In a check writer, a printing wheel, a vertically movable cross head carrying said printing wheel, a rotating feed roller engaging the upper face of the check for feeding the same, a vertically reciprocating member, a ratchet mechanism disposed between said vertically reciprocating member and said feed roller whereby the upward movements of said reciprocating member only impart movements to the feed roller, a spring for normally depressing said vertically reciprocating member, a yielding dog carried by said reciprocating member, a controlling cam associated with the printing wheel and carried by the cross head and underlying said dog whereby the upward movements of the cross head cause the controlling cam to raise the reciprocating member a distance corresponding to the word being printed, a brake for engaging the feed roller, and means actuated by the upward movement of the cross head for applying the brake just as the cross head reaches the upper extreme of its movement.

19. In a check writer, a printing wheel, a vertically movable cross head carrying said printing wheel, a rotating feed roller engaging the upper face of the check for feeding the same, a vertically reciprocating member, a ratchet mechanism disposed between said vertically reciprocating member and said feed roller whereby the upward movements of said reciprocating member only impart movements to the feed roller, a spring for normally depressing said vertically reciprocating member, a yielding dog carried by said reciprocating member, a controlling cam associated with the printing wheel and carried by the cross head and underlying said dog whereby the upward movements of the cross head cause the controlling cam to raise the reciprocating member a distance corresponding to the word being printed, and means controlled by the operator for raising the feed roller from the check for permitting the entering or withdrawing of the check.

20. In a check writer, a printing wheel, a feed roller for feeding the check, a reciprocating member, a ratchet mechanism between said reciprocating member and said feed roller whereby movements of the reciprocating member in one direction will impart feeding movements to said feed roller, means for preventing retrograde movement of said feed roller during the idle movements of said reciprocating member, a controlling cam associated with the printing wheel, and means whereby said controlling cam positively imparts feeding movements to said reciprocating member corresponding to the length of the word being printed.

21. In a check writer, a printing wheel, a feed roller for feeding the check, a reciprocating member, a ratchet mechanism between said reciprocating member and said feed roller whereby movements of the reciprocating member in one direction will impart feeding movements to said feed roller, means for preventing retrograde movement of said feed roller during the idle movements of said reciprocating member, a controlling cam associated with the printing wheel, a yielding dog carried by the reciprocating member and lying in the path of movement of said controlling cam, and means for bodily moving said controlling cam for shifting the reciprocating member so as to impart feeding movements to the feed roller corresponding in extent to the length of the word being printed.

22. In a check writer, a supporting frame, a vertically reciprocating cross head disposed within said frame, a printing wheel carried by the cross head and located in front of the same, a feeding device beneath the cross head, and mechanism located in rear of the cross head for imparting to said feeding device a movement corresponding to the length of the word being printed.

23. In a check writer, a supporting frame, a vertically reciprocating cross head disposed within said frame, a printing wheel carried by the cross head and located in front of the same, a feeding device beneath the cross head, mechanism located in rear of the cross head for imparting to said feeding device a movement corresponding to the length of the word being printed, a dial plate closing the front of the casing, said dial plate having a slot formed therethrough, and a pointer coöperating with the dial plate, and fixed relative to the printing wheel so as to move up and down therewith and rotate with said printing wheel.

24. In a check writer, a frame, a plunger reciprocating vertically in said frame, a cross head reciprocating in guides in the frame and connected to the plunger, a shaft journaled in said cross head, said plunger being geared to the shaft for rotating the same, a printing wheel mounted in front of the cross head on one end of said shaft, a feeding device beneath the cross head, a controlling cam for the feeding device for determining the length of the feeding stroke located in rear of the cross head and carried by said shaft.

25. In a check writer, a frame, a plunger reciprocating vertically in said frame, a cross head reciprocating in guides in the frame and connected to the plunger, a shaft journaled in said cross head, said plunger being geared to the shaft for rotating the same, a printing wheel mounted in front of the cross head on one end of said shaft, a feeding device beneath the cross head, a controlling cam for the feeding device for determining the length of the feeding stroke located in rear of the cross head and carried by said shaft, a dial plate for closing the front of the casing, said dial plate having an elongated slot, a pointer coöperating with the dial plate and having a detachable connection with the shaft, and means for securing said pointer in a predetermined position relative to the printing wheel.

26. In a check writer, a frame, a plunger reciprocating vertically in said frame, a cross head reciprocating in guides in the frame and connected to the plunger, a shaft journaled in said cross head, said plunger being geared to the shaft for rotating the same, a printing wheel mounted in front of the cross head on one end of said shaft, a feeding device beneath the cross head, a controlling cam for the feeding device for determining the length of the feeding stroke located in rear of the cross head and carried by said shaft, a dial plate for closing the front of the casing, said dial plate having an elongated slot, a pointer coöperating with the dial plate and having a detachable connection with the shaft, means for securing said pointer in a predetermined position relative to the printing wheel, means for frictionally holding the dial plate on the frame whereby the same may be readily removed, and means for connecting the pointer to the dial plate so that when said dial plate is removed, the pointer will be held assembled with the dial plate.

27. In a check writer, a casing including a U-shaped frame, a base to which said frame is attached, a dial plate forming the front of the casing, friction means for removably securing the dial plate to the front of the casing, a back plate secured to the frame and forming the back of the casing, a cross head located within the frame and reciprocating vertically in guideways therein, means for reciprocating the cross head, a printing wheel carried by and movable up and down with the cross head, feeding means operated by the movements of the cross head, said feeding means including a controlling cam for determining the length of the feed stroke to correspond with the word printed, a pointer having fixed relation relative to the printing wheel and movable therewith, and means for rotating the printing wheel and the controlling cam.

28. In a check writer, a printing wheel, a die plate, means for giving a relative movement to the printing wheel and die plate, a feeding device including a positively rotated feed roller, an idle roller coöperating therewith, a gage member for guiding the check as it is fed by the feeding rollers, one of said feeding rollers being tapered toward the gage member for insuring contact of the check with the gage member.

29. In a check writer, a U-shaped frame, a base to which said frame is mounted, a dial plate secured to the U-shaped frame and closing the front thereof, a back plate secured to the U-shaped frame and closing the back thereof, said dial plate and back plate being cut away to form a slot through which the check may be fed, a printing wheel within the frame, a die plate, means for imparting a relative movement to the printing wheel and die plate, a feeding mechanism within the U-shaped frame for feeding the check, a flexible stripper plate rigidly secured to the back plate and extending forwardly through the slot in the dial plate to a point in advance of the dial plate to facilitate the movement of the check beneath the dial plate, said stripper plate having an opening for the feeding device and an opening for the printing wheel.

30. In a check writer, a U-shaped frame, a base to which said frame is mounted, a dial plate secured to the U-shaped frame and closing the front thereof, a back plate secured to the U-shaped frame and closing the back thereof, said dial plate and back plate being cut away to form a slot through which the check may be fed, a printing wheel within the frame, a die plate, means for imparting a relative movement to the printing wheel and die plate, a feeding mechanism within the U-shaped frame for feeding the check, a flexible stripper plate rigidly secured to the back plate and extending forwardly through the slot in the dial plate to a point in advance of the dial plate to facilitate the movement of the check beneath the dial plate, said stripper plate having an opening for the feeding device and an opening for the printing wheel, a rod extending across the backplate above the slot beneath the same, and a gage for the check secured to said rod and extending through the slot to a point within the frame.

31. In a check writer, a U-shaped frame, a base to which said frame is mounted, a dial plate secured to the U-shaped frame and closing the front thereof, a back plate secured to the U-shaped frame and closing the back thereof, said dial plate and back plate being cut away to form a slot through which the check may be fed, a printing wheel within the frame, a die plate, means for imparting a relative movement to the printing wheel and die plate, a feeding mechanism within the U-shaped frame for feeding the check, a flexible stripper plate rigidly secured to the back plate and extending forwardly through the slot in the dial plate to a point in advance of the dial plate to facilitate the movement of the check beneath the dial plate, said stripper plate having an opening for the feeding device and an opening for the printing wheel, a rod extending across the back plate above the slot beneath the same, a gage for the check secured to said rod and extending through the slot to a point within the frame, a directing plate hinged to said rod so as to swing above the same, and means for frictionally holding the directing plate either in horizontal or vertical position.

32. In a check writer, a printing wheel having printing characters formed with ribs, a die plate coöperating with said printing wheel and having ribs thereon arranged in staggered relation to the ribs on the printing characters, said ribs on the die plate being deeper than the ribs on the printing characters.

33. In a check writer, a printing wheel having printing characters, a die plate coöperating with the printing characters, and a flexible cushion on which said die plate is mounted.

34. In a check writer, a printing wheel having printing characters provided with V-shaped ribs, a die plate coöperating with the printing wheel and having V-shaped ribs in staggered relation to the ribs on the printing characters, and a flexible cushion beneath the die plate.

35. In a check writer, a printing wheel having printing characters provided with V-shaped ribs, a die plate coöperating with the printing wheel and having V-shaped ribs in staggered relation to the ribs on the printing characters, and a flexible cushion beneath the die plate, said V-shaped ribs on the die plate being deeper than the ribs on the printing characters.

36. In a check writer, a supporting frame, a printing wheel carried thereby, a dial plate, friction means for removably securing the dial plate to the frame whereby the same may be readily detached, a pointer coöperating with the dial plate, said dial plate having a slot formed therethrough, said pointer having a hub extending through the slot, and means for detachably securing said hub in fixed position relative to the printing wheel.

37. In a check writer, a supporting frame, a printing wheel carried thereby, a dial plate, friction means for removably securing the dial plate to the frame whereby the same may be readily detached, a pointer coöperating with the dial plate, said dial plate having a slot formed therethrough, said pointer having a hub extending through the slot, means for detachably securing said hub in fixed position relative to the printing wheel, and means for holding said pointer assembled with the dial plate when said dial plate and pointer are removed.

In testimony whereof I have hereunto signed my name in the presence of two subscribing witnesses.

BENJAMIN O. FANSLOW.

Witnesses:
 PERCIVAL WILDS,
 MARIE R. LEAHY.